FIG. I.

INVENTOR
ELMER E. COMSTOCK

INVENTOR
ELMER E. COMSTOCK

Patented Sept. 2, 1947

2,426,599

UNITED STATES PATENT OFFICE 2,426,599

RECTIFIER

Elmer E. Comstock, Park Ridge, Ill.

Application February 12, 1944, Serial No. 522,148

2 Claims. (Cl. 175—363)

(Granted under the act of March 3, 1883, as amended April 30, 1928; 370 O. G. 757)

This invention relates to alternating current rectifiers.

In the usual single-phase full-wave rectifier employing thermionic valves of the vacuum or gas discharge type, the alternating current potential is invariably placed in the plate circuit and the rectifier delivers but one direct current voltage. To obtain extreme values of direct current voltage, a transformer with a high transformation ratio must be used. Such transformers are relatively expensive and a different transformer is usually required for each desired value of output voltage.

It is the object of the present invention to provide an improved alternating current rectifier in which the alternating current voltage is applied to the cathode circuit.

A further object of this invention is to provide an improved rectifier using transformers of relatively low voltage, capable of producing a relatively high direct current voltage.

A further object of the invention is to provide an improved rectifier in which the alternating current voltage is applied to both the plate and cathode circuits whereby high values of direct current voltage may be obtained by the use of alternating current transformers of relatively low transformation ratio.

A further object of the invention is to provide an improved rectifier in which reversing switches control the relative phase of the alternating current voltages applied to the plate and cathode circuits, whereby the value of the direct output voltage may be selected.

A further object of the invention is to provide an improved rectifier utilizing transformers of different transformation ratios in the plate and cathode circuits and means for changing the polarity of the transformers with respect to each other whereby the value of direct output voltage may be varied, depending upon whether the transformer potentials applied to the tube elements are of like or different value.

A further object of the invention is to provide an improved rectifier wherein the alternating current voltage is applied to transformers in both cathode and plate circuits and means are provided for changing the phase or frequency of the voltage supplied to one of the transformers relative to the other whereby any intermediate value of direct output voltage may be obtained.

A further object of the invention is to provide an improved rectifier in which unduly high voltages have been eliminated from the exposed parts thereof.

Other objects of the invention will be more fully disclosed in the following specification and claims.

According to the invention an alternating current rectifier of the full wave type using either two diode tubes, or one tube with double cathode and plate, is provided with an input transformer in the plate circuit for supplying potential thereto and another input transformer in the cathode circuit for similarly supplying alternating current potential thereto for other than heating purposes. The cathodes are heated by current supplied from the usual filament transformer. Reversing switches are used to connect the power transformers to the line so that the polarity of the cathode and plate of each tube may be changed with respect to each other thereby making available a multiplicity of direct current output voltages, providing, of course, that the transformers are of different ratings. Output voltages of the desired magnitude may be obtained by selecting transformers of a proper secondary voltage.

Figure 1:
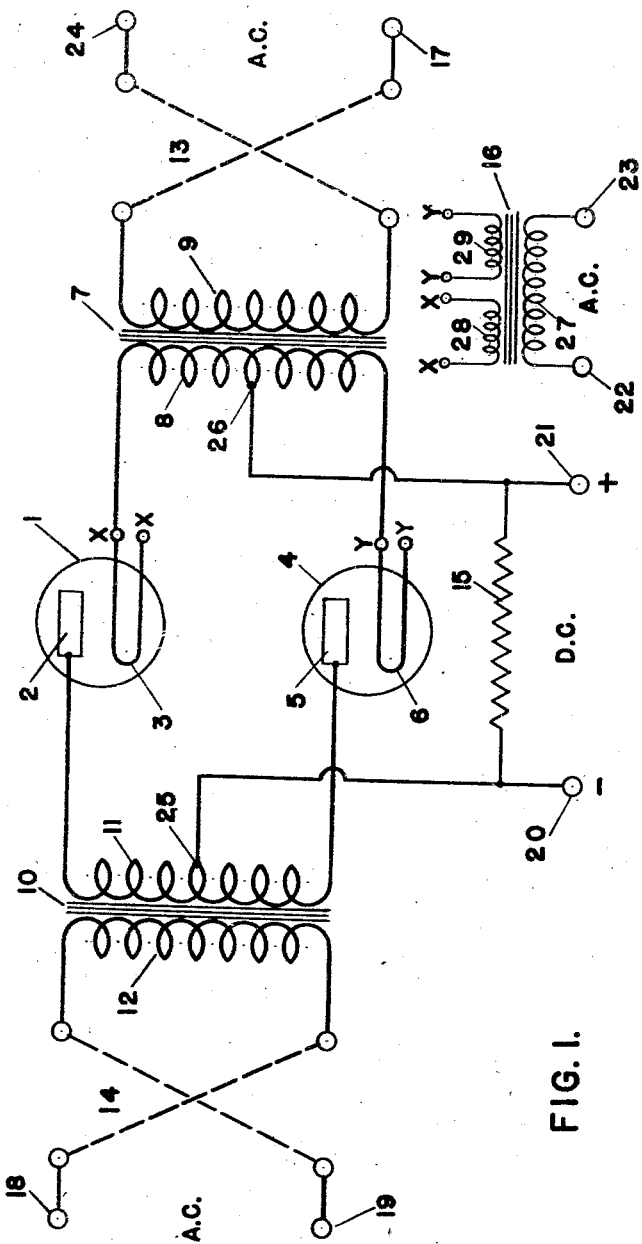
Figure 1 is a diagram of a circuit for a full wave rectifier illustrating the principle of the invention.

The rectifier disclosed in Fig. 1 has two rectifying diodes 1 and 4 which may be either gas filled or high vacuum. These tubes have anodes or plates 2 and 5 and cathodes 3 and 6, the latter, which though shown as directly heated, may be of the indirectly heated type. Heating current for the cathodes is supplied by the filament transformer 16 whose primary winding 27 is coupled to a source of alternating current power at terminals 22 and 23. The terminals XX of the secondary winding 28 are connected to the appropriate terminals XX of the filament of tube 1 by means of suitable conductors which have not been shown in the interest of clarity. Similarly terminals YY of the secondary winding 29 of the filament transformer 16 may be suitably connected to the appropriate terminals YY of the filament 6 of tube 4.

The plate potential is supplied by an iron core transformer 10 whose secondary winding 11 is connected at one end with plate 2 of tube 1 while the other end is connected to plate 5 of tube 4. The primary winding 12 is connected to a source of alternating current power at terminals 18 and 19 through the reversing switch 14. When power is applied, the transformer 10 applies an alternating potential to the plates 2 and 5 of the tubes 1 and 4 whereby when plate 2 is positive, plate 5 is negative and when plate 2 is negative plate 5 is positive. Potential is supplied to the cathodes 3 and 6 by means of transformer 7 whose secondary winding 8 is connected to cathode 3 at one end and to cathode 6 at the other. The primary winding 9 is connected through reversing switch 13 to an alternating current power source at terminals 24 and 17.

The secondaries 8 and 11 of the transformers 7 and 10 which supply potential to the cathode and plate circuits are provided with center taps 26 and 25 which are connected to the direct current output terminals 20 and 21. A resistor 15 is shown connected across these terminals.

The operation of this rectifier will be readily understood from the following description. The cathodes 3 and 6 will emit electrons when heated by current from the filament transformer 16. These electrons, being negatively charged, are attracted to positively charged bodies and repelled from those negatively charged. At the instant the secondary 11 of transformer 10 applies a positive potential to plate 2, the electrons emitted by cathode 3 are drawn thereto causing a current of electricity to flow in the plate circuit. At the same instant a negative potential is applied to plate 5, repelling electrons emitted by cathode 6 and effectively preventing a flow of current in tube 4 during this part of the alternating current cycle. When the polarity of the secondary 11 changes, tube 1 becomes non-conducting while tube 4, with the now positive charge on plate 5, permits a flow of electrons therethrough. Thus each half of the alternating current wave is rectified. At the same time an alternating current potential is being applied to the cathodes 3 and 6 by transformer 7. Assuming that it is so connected to the power source that the end of the secondary 8 connected to cathode 3 is negative when plate 2 is positive, then this negative potential on the cathode will repel the electrons emitted thereby. The other end of the secondary 8, positive at the same instant, is connected to cathode 6 which will draw any electrons emitted thereby back into the cathode 6 thus tending to prevent a flow of current in tube 4.

Thus when plate 2 is positive and cathode 3 negative, the effect of each is to cause a flow of current in the tube and the total effect is the sum of the individual effects of the potential on each tube element. The magnitude of the direct current voltage produced would be equal to the sum of the rectified voltage produced separately by each transformer at the terminals 20 and 21. For example, and merely illustrative of one of the numerous combinations available and without intending to limit the invention to the particular example presented, if the transformer 10 applies 240 volts to the plates of the tubes 1 and 4 which without the other transformer would produce 190 volts direct current, and transformer 7 applies 390 volts to cathodes 3 and 6 which would alone produce 335 volts, assuming the resistance 15 to be 35,000 ohms, 525 volts will appear at the output terminals when the instantaneous potential applied to the elements of each tube are opposite in sign.

Now if the primary 9 of the transformer 7 is disconnected from the source of power, the reactance of transformer 7 remains in the circuit to act as a choke coil of a filter circuit. Under these conditions the direct current voltage would be 165 volts. If the primary winding 8 or the secondary winding 9 of transformer 7 is shorted the reactance thereof would be canceled and the direct current voltage would then be 190 volts.

If, on the other hand, transformer 7 is connected to the power supply and transformer 10 disconnected, the direct current voltage is 300 volts. Shorting out the primary or secondary of transformer 10 will produce a direct current voltage of 335 volts.

When the polarity of the transformers is the same at any instant, that is to say, when transformer 10 applies a positive potential to plate 2 and transformer 7 also applies a positive potential to cathode 3, both the plate and cathode serve to attract electrons emitted by the cathode. Thus the tendency of the positive plate to produce a flow of current in the tube is opposed by the positive cathode and the magnitude of the current produced by these two opposing effects is determined by the difference in potential between the two tube elements. Tube 4 operates in the same manner as tube 1, except that when the elements of tube 1 are positive those of tube 4 are negative and serve to repel electrons emitted by the cathode with substantially the same effect. If transformers with the same secondary voltage are used, no direct current voltage will be produced since the equal potentials on the tube elements serve to nullify each other. If transformers of different secondary voltages are used, the direct current voltage will be some function of the difference therebetween. Reversing switches 13 and 14 in the transformer lines are provided for reversing either with respect to the other.

For example, in the circuit described above, if the polarity of transformer 7 is reversed by manipulation of switch 13, 135 volts direct current will be produced. Or, the polarity of transformer 10 could have been reversed with the same result. It is immaterial insofar as the polarity of the direct current output is concerned which transformer is the larger. That is to say, the terminal 21 leading from the center tap 26 of the cathode transformer 7 will always be positive.

In practice, the transformer having the lower voltage rating is placed in the plate circuit in order to maintain such transformer closer to ground potential and permitting the transformer with the higher rating to be subject to the highest voltage.

The preceding discussion has assumed a common source of alternating current power for the transformers. However, it is within the purview of this invention to have recourse to different sources of supply, whereby there may be different frequencies applied to transformers, or the voltage of one source may differ in phase from that of the other. While the reversing switches have the effect of producing a phase shift of 180°, intermediate phase differences are contemplated.

In any case, operation of the rectifier involves both the phase and the magnitude of the instantaneous potentials applied to the tube elements by their respective transformers. When the potential applied to the elements of a tube are 180° out of phase, the maximum direct current voltage is obtained and when in phase, the minimum output voltage is obtained. These conditions exist under operating conditions set forth above. For phase differences between these extremes the output voltage will be between the maximum and minimum obtainable.

Figure 2:
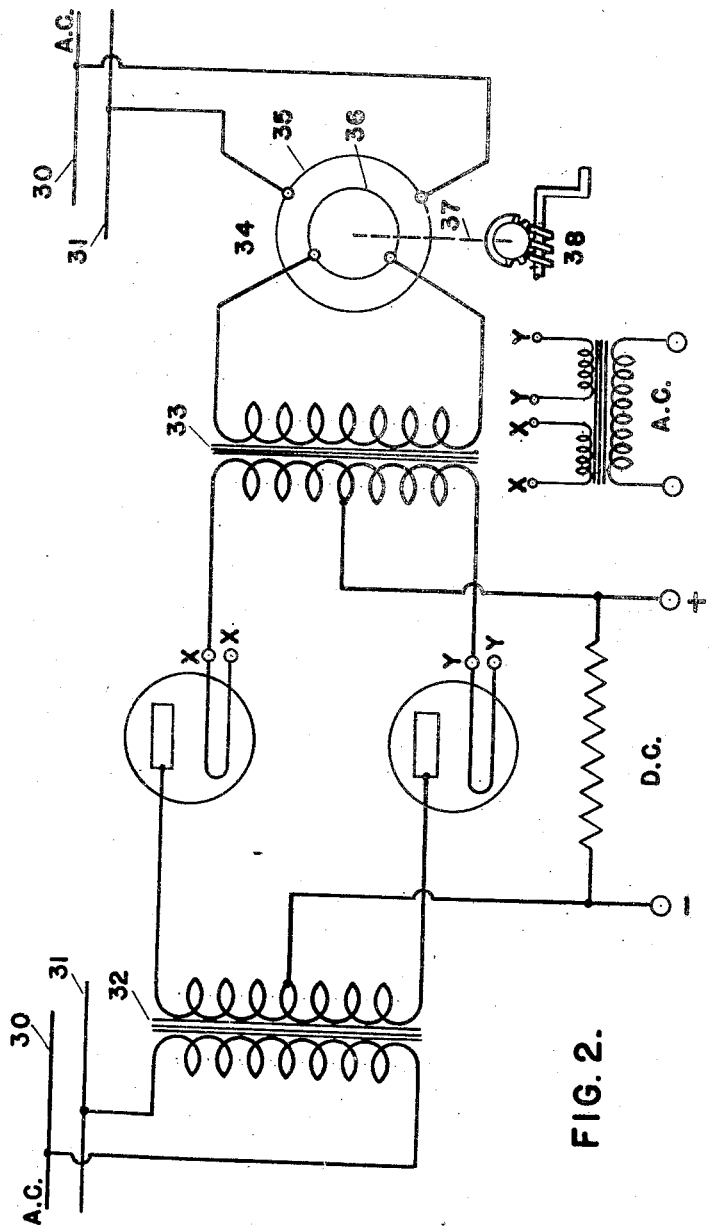
Figure 2 is a diagram of a modified form of the invention.

Figure 2 illustrates such a system in which the rectifier of Figure 1, minus the reversing switches, has one transformer 32 directly connected to the power lines 30, 31 while the other transformer 33 is connected to the power source through some phase changing means such as an induction regulator 34 whose primary 35 is connected to the power lines 30, 31 and whose secondary is connected to the primary winding of transformer 33. Shaft 37 couples the secondary 36 of the induction regulator 34 to the gear of the worm and gear 38 by means of which the position of the secondary may be varied to effect a change in phase of the voltage supplied the transformer 33. The operation is substantially the same as for the previously described rectifier. Thus by controlling the phase of the alternating current power supplied to one transformer with respect to the other any intermediate value of direct current voltage may be obtained.

While I have described the preferred form of my invention I do not wish to limit myself to the precise details as shown but wish to avail myself of such variations and modifications as may come within the scope of the appended claims.

The invention described herein may be manufactured and used by or for the Government of the United States of America for governmental purposes without the payment of any royalties thereon or therefor.

I claim:

1. A power supply system comprising in combination a pair of electron tube rectifiers each having an anode and a cathode, a first transformer having a primary winding, and a secondary winding having a center tap connection from one end of said secondary winding to the anode of one of said tubes and a connection from the other end of said secondary winding to the anode of the other of said tubes, a second transformer having a primary winding and a secondary winding having a center tap, a connection from one end of said secondary winding to the cathode of one of said tubes, and a connection from the other end of said secondary winding to the cathode of the other of said tubes, and an output circuit for said power supply system, said circuit being connected between the center taps of the said secondary windings of the said transformers, and said primary windings each being connected to a source of alternating voltage by means of reversing switches whereby the output voltage of said power supply system may be selected by selecting the relative phase of the alternating voltage applied to said primary windings.

2. An alternating current rectifier comprising in combination a pair of electronic tubes, a cathode and an anode in each of said tubes, a pair of transformers, each having a primary winding and a secondary winding, said secondary windings each having a center connection, means connecting said anodes to opposite ends of the said secondary winding of one of said transformers, means connecting said cathodes to opposite ends of the said secondary winding of the other of said transformers, a direct current output circuit connected between the centers of said secondary windings, a source of alternating voltage, said primary windings each being connected to the source of alternating voltage by switch means whereby the voltage impressed on said output circuit may be adjusted by controlling the relative phase of the alternating voltage applied to at least one of said transformer primary windings.

ELMER E. COMSTOCK.

REFERENCES CITED

The following references are of record in the file of this patent:

UNITED STATES PATENTS

| Number | Name | Date |
| --- | --- | --- |
| 1,970,889 | Heyer | Aug. 21, 1934 |
| 2,037,837 | Usselman | Apr. 21, 1936 |
| 1,946,176 | Mutscheller | Feb. 6, 1934 |
| 1,977,193 | Logan | Oct. 16, 1934 |